United States Patent Office 2,895,905
Patented July 21, 1959

2,895,905

HYDROFORMING PROCESS AND CATALYSTS

Charles Newton Kimberlin, Jr., Baton Rouge, La., assignor to Esso Research and Engineering Company, a corporation of Delaware No Drawing. Application June 13, 1957
Serial No. 665,589

15 Claims. (Cl. 196—50)

This invention relates to a process for the preparation of alumina based hydroforming catalysts or contacting agents and a method of reforming or hydroforming hydrocarbons using said catalyst or contacting agents.

The present application is a continuation-in-part of Serial No. 478,405, filed December 29, 1954, now abandoned, and Serial No. 483,444, filed January 21, 1955, now abandoned. Serial No. 478,405, now abandoned, division of my co-pending application Serial No. 180,492, filed August 19, 1950, now abandoned, and of my prior application Serial No. 60,864, filed November 19, 1948, now U.S. Patent 2,636,865, of which Serial No. 180,492, now abandoned, is a continuation-in-part. Serial No. 483,444, now abandoned, is a continuation-in-part of Serial No. 224,065, filed May 1, 1951, now U.S. Patent 2,746,937.

Hydroforming is a well known and widely used process for upgrading naphtha fractions in order to improve their octane number and engine cleanliness characteristics. Hydroforming is conducted at elevated temperatures of about 850°–1025° F., at pressures up to about 750 p.s.i.g. and in the presence of catalysts such as group VI metal oxides, preferably molybdenum oxide or a platinum group metal, preferably platinum distributed upon a support or carrier. Carriers containing alumina and usually consisting essentially of alumina in an adsorptive or activated form are most commonly used to support hydroforming catalyst components. It has been found that very small differences in catalyst composition or in the method for preparing the support or the catalyst makes for very great differences in the properties of the catalyst. This is particularly true in hydroforming processes wherein the catalyst is alternately under severe reducing conditions and oxidizing conditions.

Catalysts containing platinum distributed upon a variety of carriers or supports have been described for various specific processes in the prior art. Commercial use thereof in hydrocarbon conversions such as petroleum refining has been limited, however, because of the high cost of the platinum and also because of the difficulty of preparing the catalyst in a form which is sufficiently active for the conversion and which will retain this activity without being adversely affected by contaminants in the usual hydrocarbon feed stocks. Greensfelder U.S. Patent No. 2,317,693 discloses the addition of small amounts of platinum or palladium as a promoter to chromia-alumina cyclizing catalysts. U.S. Patent 2,478,916 discloses a process for reforming straight run gasolines in contact with catalysts prepared by compositing platinum or palladium with a dry cracking component such as silica-alumina, silica-magnesia, silica-zirconia or the like. U.S. Patents 2,479,109, and 2,479,110 disclose the reforming of naphtha fractions in contact with certain catalysts comprising platinum, alumina and from about 0.1 to about 8 wt. percent of halogen, using a carrier derived from a washed alumina gel. The activity and stability of these platinum-containing catalysts are subject to substantial variations depending upon the manner in which the catalyst compositions are prepared. This field has been the subject of intensive investigation in an effort to prepare compositions having improved activity which are stable enough for commercial use.

Laboratory studies with platinum catalysts based on the work of Zelinski and other Russian workers over the past 50 years have reported many compositions of high initial activity in hydrogenation- and dehydrogenation-type reactions, including their use in the selective conversion of light liquid hydrocarbons. Experience has shown, however, that it is important to use purified feed stocks and mild operation conditions in these experiments. This is because these highly active catalysts are easily poisoned by sulfur, and they tend to destroy their own activity by side reactions leading to the formation of coke or tarry deposits at even slightly elevated temperatures. Furthermore, while the value of the noble metal is enough to justify reworking spent catalyst to recover the platinum and remake the desired composition on a laboratory scale, the cost of the metal and the necessity of such reworking has been an important deterrent in the way of large-scale use.

It is the object of this invention to prepare hydroforming catalysts of good activity and selectivity characteristics and which moreover have good stability or are capable of retaining their activity and selectivity characteristics after prolonged use in normal hydroforming service wherein they are alternately exposed to reducing and oxidizing conditions.

It is an object of this invention to prepare catalysts having high activity and stability in the catalytic reforming or hydroforming of commercial feed stocks or hydrocarbon fractions boiling in the motorfuel or naphtha boiling range.

It is another object of this invention to devise a novel method for preparing platinum- or palladium-containing catalyst compositions. It is also an object of this invention to devise a new method for preparing platinum-alumina or palladium-alumina composite catalysts of high activity and stability in a simple, facile manner.

It is a further object of this invention to prepare new hydroforming catalysts of high activity and selectivity comprising group VI metal oxides upon a support.

Another object of this invention is the novel catalysts prepared by the method described hereinafter.

It is a further object of this invention to hydroform naphtha or gasoline fractions in contact with catalysts prepared as described hereinafter.

These and other objects will appear more clearly from the detailed specification and claims which follow. It will be understood that while this description refers at places primarily to platinum and the preparation or use of Pt-containing catalysts, the same techniques can be employed to advantage in the preparation and use of analogous catalysts containing palladium or certain other noble metals such as rhodium, on an alumina base. Similarly where the description refers to molybdenum oxide, it will be understood that essentially the same techniques can be employed for the preparation of other group VI metal oxide hydroforming catalysts.

It has now been found that catalysts which are especially effective for the hydroforming of naphtha fractions may be prepared by supporting platinum (or palladium) or group VI metal oxides on alumina prepared from an aluminum alkoxide. The catalytic properties of catalysts on such bases are outstanding. It has been found that superior hydroforming results are obtainable with catalysts prepared by compositing a group VI metal oxide catalyst component or a platinum group metal upon a high purity alumina base derived from an aluminum alkoxide.

The aluminas used as a catalyst support in accordance with the present invention are pure forms of active alumina prepared by hydrolysis of an aluminum alkoxide such as aluminum ethylate, aluminum isopropylate, aluminum butylate, aluminum amylate, and the like. An aluminum alkoxide derived from a substantially water insoluble alcohol containing 4 or more carbon atoms is preferred, because of the ease of recovery of the insoluble alcohols in anhydrous form for re-use in the preparation of further amounts of aluminum alkoxide. These alkoxides or alcoholates of aluminum may be prepared in a variety of ways and converted to catalytically active alumina supports, as described in detail by the present applicant in a prior U.S. Patent 2,636,865 entitled "Preparation of Alumina from Higher Alcoholates of Aluminum." Aluminas prepared by the hydrolysis of an aluminum alkoxide or alcoholate may be described generically as "alcoholate aluminas."

A number of important advantages are realized by using such an alcoholate alumina as the support for reforming or hydroforming catalysts, according to the present invention. Foremost of these is the high activity of these catalysts, which can be used in naphtha hydroforming, for example, to give a product of significantly higher octane rating at a given yield than that obtained with similar catalysts upon other alumina supports. Another important advantage lies in cost and ease of manufacture. Pure alumina is derived directly from the hydrolysis of an aluminum alcoholate without any washing of the hydrolysis product, because there are no inorganic cations or anions present to be removed. The washing of alumina gels as described in the prior art to remove foreign materials such as sodium or chloride or sulfate ions formed during the hydrolysis of the corresponding aluminate or aluminum salt is tedious and costly, because the gels are hard to filter and these ions are strongly adsorbed. Furthermore, the washed product obtained in these prior art processes is never entirely pure, because the purer it becomes on washing, the harder it is to filter.

If an alumina gel is desired, the slurry of hydrous alumina obtained as described above may be dried and activated by application of heat. If it is desired to modify the properties of the gel, the slurry may be treated in various ways before drying, i.e., the hydrogen ion concentration may be adjusted, an aging treatment at controlled temperatures may be used, or a peptizing agent may be added to convert the alumina into a hydrosol.

If an alumina based catalyst is desired, the slurry of hydrous alumina may be treated with an impregnating solution of a catalytic material before drying, e.g. a solution of ammonium molybdate, chromic acid, or other catalytic or promoter agent may be added to the slurry. If desired, the aqueous solution used to hydrolyze the aluminum alcoholate may be a solution containing a catalytic or promoter agent.

The platinum (or palladium) may be added to the alumina in any desired manner. For example, an impregnating solution of chloroplatinic acid, ammonium chloroplatinate or palladium chloride may be prepared and mixed with the alumina, either before or after the wet slurry is dried to form the active alumina base. This solution may be used by itself or in admixture with an added halide and the composite may then be heated to convert the catalytic metal compound to the metal and, if necessary, activating the composition by heating to elevated temperatures or passing a reducing gas over the composite at temperatures of about 500 to 1000° F. until the composite shows the desired activity. In the event that the platinum or palladium compound is not readily decomposed by heating, then the composite may first be treated with hydrogen sulfide to fix the catalytic metal followed by drying and heating, in the presence of a reducing gas if necessary. Alternatively, the platinum or palladium salt solution may be treated with hydrogen sulfide and the resultant brown solution or sol then may be mixed with the alumina. The metal-containing solution is ordinarily added in the form of a commercially available halide such as chloroplatinic acid, which contributes halogen to the composition. The platinum or palladium compound should be added to the alumina in sufficient amount that the final catalyst contains from 0.01 to 2 or even 4 or more wt. percent of platinum or palladium, preferably, from 0.1 to 2 wt. percent of platinum or from 0.5 to 3 wt. percent of palladium.

In some cases it may be desirable to incorporate from about 0.1 to 4 wt. percent of added halogen in the catalyst composition, beyond that ordinarily introduced with the chloroplatinic acid or similar metal halide impregnating solution. This may be accomplished by adding hydrogen fluoride, hydrochloric acid or a halogen compound such as ammonium fluoride, ammonium acid fluoride, aluminum chloride or the like to the platinum (or palladium) solution before compositing the same with the alumina, or it may be added to the platinum- or palladium-containing composite.

Still another advantage of using aluminum alcoholate as the source of the alumina base according to the present invention lies in its versatility and ease of handling. The alcoholate may be hydrolyzed and the initial product converted to various forms of dry alumina by any one of a number of ways, all of which benefit from the fact that no washing is required to give a pure alumina as the final product. Thus, the prior U.S. Patent 2,636,865 mentioned above describes the hydrolysis using either water or an aqueous solution, such as dilute acetic acid or a hydrosol, and the hydrolyzed product may be aged, peptized, or adjusted as to temperature or hydrogen ion concentration in any way desired to modify the properties of the final dried gel. Many changes are likewise possible in the final drying or activation steps. A number of different alcoholate aluminas have been found to form excellent platinum-on-alumina and molybdenum oxide on alumina catalysts for naphtha reforming, and all of these modifications retain the advantages noted in alumina purity and ease of manufacture.

Among other modifications of the basic procedure, the alcoholate may be hydrolyzed by a solution containing the catalytic agent, instead of impregnating the wet alumina slurry or a peptized sol or dried alumina base derived therefrom. Thus, one particular method of treating the aluminum alcoholate which may be used to advantage in the preparation of these catalysts may be to convert it into an alumina hydrosol in the manner described in Hunter and Kimberlin U.S. Patent No. 2,656,321, and then combine this hydrosol with a suitable platinum- or palladium-containing solution in the manner described. This conversion to the hydrosol may be accomplished by adding a small amount of a peptizing agent such as glacial acetic acid to the aluminum alcoholate dissolved in an excess of alcohol or in a hydrocarbon solvent, followed by hydrolyzing the alcoholate containing the peptizing agent by vigorously mixing the water, preferably at about 150°–200° F., and recovering the alumina hydrosol thus produced. The preferred hydrosols contain about 1 to 6 wt. percent alumina, in an extremely high degree of dispersion, and show no tendency to settle upon standing in a quiescent state. Upon drying, this type of sol produces a clear, glassy alumina gel in contrast to the chalky gel produced by the usual peptized precipitates of alumina. It is also possible to set the platinum-containing sol to a hydrogel and then proceed with the further preparation. Where additional halogen is desired in the catalyst, this may be added to the platinum-containing solution either before or after the sol is composited therewith, or it may be added to the hydrogel if one is formed.

Alternatively, the sol or gel containing the platinum salt may be dried and the dry gel treated with a suitable gaseous or aqueous halogen compound or solution.

After adding the platinum (or palladium) compound to the alcoholate alumina and after sulfiding or halogen addition as desired, the finished catalyst is produced by drying at a moderate temperature of about 200° to 400° F. and calcining. Before use for reforming, the catalyst may be reduced if desired by treatment with hydrogen or a recycle gas from the hydroforming process. This reduction may be carried out, for example, by treating the pilled catalyst with a suitable hydrogen-containing gas at 500° to 1000° F. for 1 to 3 hours.

Group VI metal oxides may be composited with the alcoholate alumina in various ways. As a typical example, molybdenum oxide can be composited with the hydrous alumina slurry or with the dried and adsorptive alumina by mixing a solution of ammonium molybdate therewith. Alternatively, a molybdic oxide sol or dry molybdic oxide or a water slurry of molybdic oxide may be mixed with the alumina and fixed thereon by heating to elevated temperatures of about 1000°–1200° F. The amount of group VI metal compound added is somewhat variable. In the case of molybdenum, the amount added is usually sufficient to provide from about 1 to about 15 wt. percent molybdic oxide in the catalyst composition while for chromium the amount added should be sufficient to provide about 5 to 40 wt. percent chromic oxide in the catalyst composition.

According to this invention, petroleum naphtha and similar hydrocarbon mixtures containing appreciable quantities of naphthenes can be subjected to a reforming operation to yield a liquid product of improved octane number boiling within the gasoline range. Depending upon reaction conditions, catalytic reforming operations are generally referred to as either hydroforming or aromatization reactions. By hydroforming is ordinarily meant an operation conducted at elevated temperatures and pressures in the presence of a solid catalyst and added hydrogen wherein a hydrocarbon fraction is increased in aromaticity and wherein there is no net consumption of hydrogen. The term aromatization refers to an operation in which a hydrocarbon or hydrocarbon fraction is treated at elevated temperatures but at substantially atmospheric pressure in the presence of a solid catalyst for the purpose of increasing the aromaticity of the hydrocarbon or hydrocarbon fraction.

Catalytic reforming operations are usually carried out at temperatures of around 850° to 1100° F. in the presence of such catalysts as platinum or other platinum group metal, molybdenum oxide, chromium oxide and the like. In accordance with this invention these catalysts are usually supported on a base or carrier consisting essentially of alumina derived from aluminum alcoholate. Reforming is effected at elevated pressures, preferably about 50 to about 500 p.s.i.g., and in the presence of hydrogen or hydrogen-rich process gas in amounts of from about 500 to 7,500 s.c.f. per barrel of liquid naphtha feed. The catalyst may be in the form of a fixed or moving bed through which the vaporized hydrocarbon feed and hydrogen is passed or the so-called fluidized solids technique may be used in which the catalyst in finely divided form is suspended in the reactant vapors. In the moving bed and fluidized solids technique, the catalyst is continuously circulated from the reforming zone to a regeneration zone wherein the inactivating carbonaceous materials deposited on the catalyst during reforming are burned off with air or oxygen-containing regeneration gas. In fixed bed operation it is necessary periodically to take the reactor off-stream and regenerate it.

The invention is further described and illustrated by the following examples.

EXAMPLE 1

270 grams of aluminum were dissolved in 10 liters of a mixture of anhydrous normal amyl alcohol and a petroleum distillate boiling within a range of from 300° to 400° F. The mixture of alcohol and petroleum distillate was in a ratio of one part of alcohol to one part of petroleum distillate, by volume. A small amount of mercuric chloride, about 0.001 part of mercuric chloride per part of aluminum metal by weight was added. To initiate the reaction, the mixture was heated to boiling, after which the reaction proceeded to completion without further heating. The solution of aluminum amylate thus obtained was hydrolyzed by treatment with 17.5 liters of distilled water. The petroleum distillate and regenerated alcohol layer was decanted from the aqueous slurry of hydrous alumina and dried by distilling off the water and reused in a subsequent preparation without further treatment.

The aqueous slurry of hydrous alumina was concentrated by settling to approximately 8% solids content. There were then added to the alumina slurry 680 cc. of ammonium molybdate solution containing 55.5 grams of molybdenum oxide. The mixture was dried in an oven at 240° F. and then activated by heating at 850° F.

The product was a hard, adsorptive catalyst comprising 10% molybdenum oxide on alumina gel. Its surface area was 380 square meters per gram. This catalyst was used to hydroform an East Texas virgin naphtha boiling within a range of 267 to 418° F. and having a CFR-research octane number of 41.7. In the series of runs, the following operating conditions were established:

Pressure, p.s.i.g. _____ 200
Average catalyst temp., ° F. _____ 929
V./v./hr.[1] _____ .97
Hydrogen, c.f./b.[2] _____ 1970

[1] Volumes of liquid feed per volume of catalyst per hour.
[2] Cubic feet of hydrogen under standard conditions per barrel of feed.

Under these conditions, the following yields were obtained:

Gasoline, vol. percent _____ 82.0
CFR-Research octane no. _____ 95.0
Carbon, wt. percent on feed _____ .20

EXAMPLE 2

432 g. of aluminum turnings were dissolved in 16 liters of a 50–50 mixture of anhydrous normal amyl alcohol and a petroleum distillate boiling in the range of from 300° F. to 400° F. A small amount of mercuric chloride, about 0.0005 part of mercuric chloride, per part of aluminum by weight, was used as a catalyst to dissolve the metal. To initiate the reaction, the mixture was heated to boiling by means of a steam coil. After the reaction was well started, cooling was necessary. The cooling was done by means of a coil immersed in the reaction mixture. Toward the end of the reaction, the mixture was again heated to complete the solution of the metal. About 30 minutes is required for the reaction between the aluminum and the alcohol by the procedure described.

The solution of aluminum amylate thus obtained was hydrolyzed with 16 liters of distilled water. The hydrolysis was accomplished by pumping the aluminum amylate solution and the water simultaneously through a small centrifugal pump. The feed lines to the pump were so constructed that the two streams were mixed just before reaching the impeller of the pump. The discharge from the pump was placed in a vessel and allowed to remain quiescent for about 10 minutes at the end of which time the petroleum distillate-regenerated alcohol mixture and the aqueous slurry of alumina had separated as two distinct liquid layers. The petroleum distillate-regenerated alcohol layer was decanted and dried by distilling off the small amount of water and reused in a subsequent preparation without further treatment.

To the layer comprising the aqueous slurry of alumina was added acetic acid in the ratio of about 5 liters of acetic acid per 100 pounds of aluminum metal. After standing for 1 hour, there were then added to the acidified alumina slurry 1000 cc. of an ammonium molybdate solution containing approximately 90.5 g. of molybdenum oxide. The mixture was dried in an oven at 250° F. and then activated by heating to 850° F.

The product was a hard, adsorptive material comprising 10% molybdenum oxide on alumina gel. Its surface area was 372 square meters per gram. An East Texas virgin naphtha boiling in the range of 267° F. to 418° F. and having a CFR-research octane number of 41.7 was passed over this catalyst under conditions of 930° F., 200 p.s.i.g., a feed rate of 0.49 volume of naphtha per volume of catalyst per hour and with hydrogen introduced into the reactor at the rate of 1580 standard cubic feet per barrel of naphtha feed. The process period was 12 hours. There was obtained a liquid product and 75.5 volume percent yield based on the naphtha feed having a CFR-Research octane number of 100.1.

After the process period was completed, the catalyst was regenerated by burning off carbon amounting to 0.79 weight percent of naphtha feed. After regeneration, the process period feeding naphtha was repeated.

EXAMPLE 3

A slurry of hydrous alumina was prepared from 432 g. of aluminum metal as described in Example 2. Acetic acid in the ratio of 5 liters of acetic acid per 100 lbs. of aluminum metal was added to the slurry. Then after standing for 24 hours, there were added to the acidified alumina slurry 1000 cc. of a solution containing approximately 90.5 g. of molybdenum oxide. The mixture was dried in an oven at 250° F. and then activated by heating at 850° F.

The product was a hard, adsorptive material comprising 10% molybdenum oxide on alumina gel. Its surface area was 405 square meters per gram. It is useful in hydroforming processes.

EXAMPLE 4

A slurry of hydrous alumina was prepared from 432 g. of alumina metal as described in Example 2. 110 cc. of ammonium hydroxide solution containing 27 g. of ammonia were added to the alumina slurry. There were then added 1000 cc. of an ammonium molybdate solution containing approximately 90.5 g. of molybdenum oxide. The impregnated slurry was dried in an oven at 250° F. and then activated by heating to 850° F.

The product was a hard, adsorptive material comprising 10% molybdenum oxide on alumina gel. Its surface area was 328 square meters per gram. It is useful in hydroforming processes.

EXAMPLE 5

A slurry of hydrous alumina was prepared from 432 g. of aluminum metal as described in Example 2. The slurry was dried in an oven at 250° F. The dried alumina gel was ground to a powder and then thoroughly mixed with 500 cc. of a solution of ammonium molybdate containing approximately 90.5 g. of molybdenum oxide. The gel was then redried in an oven at 250° F. and activated by heating to 850° F.

The resultant impregnated, activated gel comprised 10% molybdenum oxide on alumina gel and had a surface area of 388 square meters per gram. It is very useful in hydroforming processes.

EXAMPLE 6

A slurry of hydrous alumina was prepared from 432 g. of aluminum metal as described in Example 2. To this slurry was added in succession 500 cc. of a solution of calcium nitrate containing approximately 23.4 g. of calcium oxide and 1000 cc. of a solution of ammonium molybdate containing approximately 93.4 g. of molybdenum oxide. The impregnated slurry was then dried in an oven at 250° F. and the dry gel was activated by heating to 850° F.

The product was a hard, adsorptive catalytic material comprising 87.5% aluminum oxide, 10% molybdenum oxide and 2.5% calcium oxide. It had a surface area of 343 square meters per gram. This catalyst was used to hydroform an East Texas virgin naphtha boiling within a range of 267° to 418° F. and having a CFR-Research octane number of 41.7. In the series of runs, the following operating conditions were established:

Pressure, p.s.i.g. ------------------------------ 200
Average catalyst temp., °F. -------------------- 930
V./v./hr.[1] ------------------------------------ 0.94
Hydrogen, c.f./b.[2] ---------------------------- 1530

[1] Volumes of liquid feed per volume of catalyst per hour.
[2] Cubic feet of hydrogen under standard conditions per barrel of feed.

Under these conditions, the following yields were obtained:
Gasoline, vol. percent -------------------------- 87.6
CRF-Research octane no. ------------------------ 84.6
Carbon, wt. percent on feed -------------------- 0.0

EXAMPLE 7

A solution of aluminum amylate was prepared as described in Example 2 by dissolving 432 g. of aluminum metal in 16 liters of a 50-50 mixture of amyl alcohol and a petroleum distillate boiling in the range of 300° F. to 400° F. in the presence of 0.2 g. of mercuric chloride.

A silica hydrosol was prepared by passing 3650 cc. of a solution of sodium silicate ($Na_2O \cdot 3.25SiO_2$) containing 30 g. of silicon dioxide per liter through a bed of 2250 cc. of an acid regenerated cation exchange resin. Any commercial cation exchange resin such as an insoluble polymer prepared from acidic monomers such as phenols, phenol sulphonic acid or phenol carboxylic acid, on a sulphonated carbonaceous material such as sulphonated coal, sulphonated peat, etc. may be used. Amberlite IR-100 (Resinous Products Co.) believed to be made by reacting a phenol sulphonic acid with formaldehyde was used in this example. This sol prepared in this manner gave an acid reaction toward litmus and contained approximately 28 g. of silicon dioxide per liter.

1570 cc. of the above silica sol was diluted to 16 liters with distilled water and this diluted sol was used to hydrolyze the aluminum amylate solution. The hydrolysis was accomplished by passing the two liquids simultaneously through a centrifugal pump as described in Example 2. Upon settling there formed an aqueous slurry of hydrous alumina and hydrous silica from which the petroleum distillate-regenerated alcohol readily separated as a separate liquid layer. This liquid layer was decanted and dried by distilling off the residual water and was re-used in a subsequent preparation without further treatment.

The aqueous slurry of hydrous alumina and hydrous silica thus prepared was mixed with 1000 cc. of a solution of ammonium molybdate containing approximately 95.5 g. of molybdenum trioxide. The mixture was dried in an oven at 250° F. and activated by heating to 850° F.

The resultant impregnated alumina-silica gel was comprised of 85.5% aluminum oxide, 4.5% silicon dioxide and 10% molybdenum oxide and had a surface area of 452 square meters per gram. It is useful as a hydroforming catalyst.

EXAMPLE 8

An aqueous slurry of hydrous alumina and hydrous silica was prepared according to Example 7. Acetic acid was added in the ratio of 5 liters of acetic acid per 100 pounds of aluminum metal and the mixture was allowed to set for 24 hours. There were then added 1000 cc. of ammonium molybdate solution containing approximately 95.5 g. of molybdenum oxide. It was then dried in an over at 250° F. and activated by heating at 850° F.

The product which is useful as a hydroforming catalyst was a hard adsorptive material comprising 85.5% aluminum oxide, 4.5% silicon dioxide, and 10% molybdenum oxide, and had a surface area of 423 square meters per gram.

EXAMPLE 9

A slurry of hydrous alumina was prepared from 432 g. of aluminum metal as described in Example 2. The slurry was evaporated in an oven to a solids content of 12.5%. To this was added 650 g. of dry process zinc oxide made by burning zinc metal in air and acetic acid in the ratio of 5 liters of acetic acid per 100 pounds of aluminum metal. The mixture was mixed in a ball mill for 1 hour. Then there were added 184 g. of powdered ammonium molybdate (81.4% $MoO_3$) and the ball milling was continued for an additional 1.5 hours. The mixture was then dried in an oven at 250° F. and activated by heating to 850° F.

The product was a hard, adsorptive material comprising 90% zinc aluminate and 10% molybdenum oxide and had a surface area of 209 sq. meters per gram. It is useful as a hydroforming catalyst.

EXAMPLE 10

A slurry of hydrous alumina was prepared from 432 g. of aluminum metal as described in Example 2. The slurry was then impregnated with 200 cc. of a solution of cerium nitrate containing approximately 7.5 g. of cerium oxide ($Ce_2O_3$), 300 cc. of a solution of potassium dichromate containing approximately 10.9 g. of potassium oxide and approximately 17.6 g. of chromium oxide ($Cr_2O_3$), and 500 cc. of a solution of ammonium dichromate containing approximately 108.6 g. of chromium oxide. The mixture was dried in an oven at 250° F. and activated by heating at 850° F.

The product was a hard, adsorptive material comprising 86.6% aluminum oxide, 11.5% chromium oxide, 1.1% potassium oxide, and 0.8% cerium oxide, and had a surface area of 343 square meters per gram. It is useful as an aromatization or low pressure (25–75 p.s.i.g.) hydroforming catalyst.

EXAMPLE 11

A slurry of hydrous alumina was prepared from 432 g. of aluminum metal as described in Example 2.

A silica hydrosol containing approximately 28 g. of silicon dioxide per liter was prepared as described in Example 7.

2040 cc. of the silica hydrosol were added to the hydrous alumina slurry. It was then impregnated with 100 cc. of a solution of cerium nitrate containing approximately 18.2 g. of cerium oxide, 200 cc. of potassium dichromate containing approximately 13.6 g. of potassium oxide and 22 g. of chromium oxide, and 800 cc. of a solution of ammonium dichromate containing approximately 140 g. of chromium oxide. The mixture was dried in an oven at 250° F. and then activated by heating to 850° F.

The product was a hard, adsorptive material comprising 76.5% aluminum oxide, 5.4% silicon dioxide, 15.2% chromium oxide, 1.8% cerium oxide, and 1.7% potassium oxide. It had a surface area of 382 square meters per gram. It is useful in aromatization or low pressure (25–75 p.s.i.g.) hydroforming processes.

EXAMPLE 12

A slurry of hydrous alumina was prepared from 432 g. of aluminum metal as described in Example 2. Acetic acid was added in the ratio of 5 liters of acetic acid per 100 pounds of aluminum metal. The acidified slurry was allowed to stand for 5 hours and then impregnated with 117 g. of ammonium metavanadate dissolved in approximately 3 liters of distilled water. The impregnated slurry was dried in an oven at 250° F. and then activated by heating to 850° F.

The catalyst resulting comprised 90% aluminum oxide and 10% vanadium oxide. It had a surface area of 307 square meters per gram. This catalyst is useful for hydroforming or dehydrogenation processes.

EXAMPLE 13

A slurry of hydrous alumina was prepared from 432 g. of aluminum metal as described in Example 2. This was impregnated with 98 g. of "soluble" tungstic acid dissolved in approximately 2 liters of water containing 80 cc. of 28% ammonia. 75 cc. of acetic acid were added to the impregnated slurry and the mixture was dried in an oven at 250° F. and activated by heating to 850° F.

The resultant catalyst comprised 90% aluminum oxide and 10% tungsten trioxide and had a surface area of 291 square meters per gram. It is useful for hydrogenation and catalytic cracking processes.

EXAMPLE 14

27 g. of aluminum were dissolved in 1 liter of 50/50 normal amyl alcohol-petroleum distillate solution as described in Example 1. The alcoholic solution was treated with 2 liters of 0.1 N-acetic acid. There was formed a slurry of hydrous alumina from which the petroleum distillate and regenerated alcohol were decanted and dried for reuse as described in Example 1. The slurry was placed in an oven at 220° F. After a few hours in the oven, the alumina had become peptized forming a hydrosol rather than the slurry of gelatinous alumina.

The alumina hydrosol was concentrated to approximately 6% solid content by evaporation and was emulsified with approximately 10 times its volume of naphtha, using "Aerosol" as an emulsifying agent. A small amount of morpholine was added to the oil prior to the emulsification so as to give the sol a pH of about 9 after emulsification which is favorable for the gelation of the alumina sol. The gelation occurred rather rapidly but the mass was stirred during the entire setting period which is completed in about an hour. The gel particles were separated by filtration and activated by heating to 850° F. The sizes of the gel microspheres so formed were of 60 to 100 microns and were of uniform shape. This material is an excellent base or support for molybdenum oxide or platinum and may be readily converted to active hydroforming catalyst by impregnation with ammonium molybdate solution in sufficient amount to provide 10 wt. percent $MoO_3$ in the composite or with chloroplatinic acid in sufficient amount to provide 0.1 to 0.6 wt. percent platinum in the catalyst.

EXAMPLE 15

Aluminum alcoholate solution is made batchwise by the following procedure. 432 grams of aluminum turnings are dissolved in 16 liters of a mixture of anhydrous amyl alcohol and a petroleum distillate boiling within the range of from 300 to 400° F. The alcohol used is a mixture of amyl alcohols (Pentasol as sold by Sharples Chemical Co.). The mixture of alcohol and petroleum distillate is in a ratio of one part of alcohol to one part of petroleum distillate by volume. A small amount of mercuric chloride about 0.001 part of mercuric chloride per part of aluminum by weight, is added. The mixture is heated to boiling to initiate the reaction, after which the reaction proceeds to completion without further heating.

The solution of aluminum amylate thus prepared is hydrolyzed by mixing with 16 liters of distilled water at about 80° F. The hydrolysis reaction is practically instantaneous and is accomplished by simultaneously pumping the aluminum amylate solution and the distilled water through a small centrifugal pump. This forms an aqueous slurry of hydrous alumina, from which the petroleum distillate-regenerated alcohol mixture separates readily as a supernatant layer. This liquid layer is decanted and dried by distilling off the water and reused in a subsequent preparation without further treatment.

The alumina slurry is allowed to settle overnight and a layer of clear water is then decanted, leaving a concentrated slurry containing approximately 8% alumina. This concentrated slurry is dried in an oven at about 220–250° F. This base is activated by calcining for 9 hours after gradually raising the temperature to 900° F. The product is a pure, highly adsorptive alumina gel. 498 grams of this base are then impregnated with a solution containing 67 grams of 10% aqueous chloroplatinic acid diluted to 425 cc. in distilled water. The impregnated catalyst is dried at room temperature, and further dried overnight at 250° F., to give an active hydroforming catalyst comprising 0.5 wt. percent Pt on an alcoholate alumina base. For use in a fixed bed hydroforming operation the dried catalyst is formed by compression into cylindrical pills having a diameter of 3⁄16" and a length of 3⁄16".

EXAMPLE 16

The hydroforming activity of the alcoholate alumina base catalyst prepared according to Example 15 is shown by test data obtained using the pilled catalyst in a fixed bed catalyst test unit under the following operating conditions:

| | |
|---|---|
| Pressure, p.s.i.g | 200 |
| Average catalyst temperature, ° F. | 900 |
| Hydrogen, cu. ft. per bbl. of feed | 6000 |
| Oil feed, lbs./hr./lb. of catalyst | 1 |
| Reaction period, hours | 4 |

Under these conditions of 200–330° F. heavy virgin naphtha having an initial Research clear octane number of 51.3 is converted to a total liquid product of 103.4 Research clear octane rating. Following regeneration by burning in diluted air, the same catalyst in a second cycle gives a $C_5+$ product of 100.6 octane in 74.3 volume percent yield, plus 12.5% of total $C_4$, or a $C_4$—430° F. yield of 86.8 volume percent on feed.

EXAMPLE 17

An active platinum-alumina-fluoride catalyst is prepared on an alcoholate alumina base as follows: 855 grams of the dried (250° F.) alumina base prepared as in Example 15 above is pulverized and formed into a paste with 500 cc. of a dilute aqueous solution containing 16 grams of hydrogen fluoride, contacted overnight at room temperature and then dried for 16 hours at 250° F. The powdered catalyst support prepared in this manner is worked into a paste with 500 cc. of an aqueous solution containing 7.5 grams of chloroplatinic acid, and then platinum sulfide is precipitated by bubbling hydrogen sulfide through the paste for 1½ hours. After drying at 250° F. the catalyst is pilled and calcined for 2 hours at 950° F. The active catalyst thus prepared is found on analysis to contain 0.41 wt. percent of Pt and 1.63 wt. percent of fluoride.

EXAMPLE 18

864 g. aluminum metal turnings are dissolved in 32 liters of a 50–50 mixture of Pentasol (mixed amyl alcohols) and a 240° to 280° F. petroleum naphtha cut, adding about 0.86 g. of $HgCl_2$ as a catalyst to promote the reaction. When the reaction is complete the resulting aluminum amylate solution is mixed in rapid sequence with (1) 544 grams of glacial acetic acid dissolved in about 20 liters of a 50—50 mixture of Pentasol and petroleum naphtha and with (2) 117 lbs. of distilled water heated to about 180° F. The mixing is accomplished by means of two small centrifugal pumps. In the first pump the aluminum amylate solution is mixed with the acetic acid solution in volumetric ratio of about 3 to 2 and in the second pump the discharge from the first pump is mixed with the distilled water in volumetric ratio of about 1 to 1.

The mixture is then discharged into a vessel and allowed to stand for 10 minutes, during which time it separates into two layers. The upper non-aqueous layer comprises the major portion of the alcohol and hydrocarbon used, which is here drawn off and dried for re-use in reaction with additional aluminum metal. The lower aqueous phase comprises an alumina hydrosol containing about 3% by wt. of $Al_2O_3$ and about 1% by wt. of acetic acid.

This hydrosol is then charged to a stripping vessel and heated to take over-head any residual alcohol or hydrocarbon in the sol. Water taken over-head may be returned to the hydrosol. The product hydrosol is clear and dries to form a transparent glassy gel.

12 liters of this 3% alumina hydrosol (about 360 g. $Al_2O_3$) is agitated in a crock with a lightning mixer, and to it is added 19.1 g. of 10% aqueous $H_2PtCl_6·6H_2O$ (0.72 g. Pt). Agitation is continued 30 minutes and the hydrosol is then dried at 240° F. to form an active gel catalyst having a nominal composition of $$99.8Al_2O_3—0.2Pt$$

EXAMPLE 19

Ten liters of an alumina hydrosol prepared according to Example 18, containing about 310 grams $Al_2O_3$ are charged to a crock. There is then added thereto with mild agitation at room temperature a mixture containing 6.57 grams of 48% aqueous HF and 43.2 grams of 10% aqueous $H_2PtCl_6·6H_2O$ (3.15 grams HF and 1.63 grams Pt). Localized gelation takes place during this addition, and the mixture is homogenized by agitation overnight. The homogenized mixture is treated by bubbling a vigorous stream of hydrogen sulfide through it for 30 minutes and sufficient 28% aqueous $NH_4OH$ is added to adjust the sulfided mixture to a pH of between 5.0 and 6.0. The mixture is then dried at 250° F. giving a catalyst comprising $98.5Al_2O_3$—$0.5Pt$—$1.0HF$.

The catalyst thus prepared is ground and pilled, and charged to a fixed bed testing unit. It is activated by heating for 12 hours at 900° F. under a hydrogen pressure of 200 p.s.i.g., and then used to hydroform a 200–330° F. virgin naphtha cut having an initial research clear octane number of 49.4, under the same conditions of temperature and feed rate described above in Example 16. In an extended test where the reaction mixture is passed over the catalyst for five 3 hour cycles alternating with hydrogen flow in the absence of feed for 6 hours, to regenerate the catalyst by removing incipient deposits therefrom, the composite liquid product for 5 cycles has a clear research octane number of 100.9. This product is recovered in a 87.3 volume percent yield of $C_4$—430° F. product.

EXAMPLE 20

Ten liters of aluminum amylate solution prepared as in Example I are hydrolyzed at a temperature below 60° F. by stirring into 30 liters of cold water, over a period of 30 minutes, and after stirring for an additional 15 minutes and settling for about an hour the organic layer is decanted from the alumina slurry. To twice this quantity of slurry thus prepared, 162 cc. of 10% aqueous chloroplatinic acid is added and stirred for a total of about 25 minutes, and the impregnated slurry is dried at 250° F.

The active catalyst prepared in this way is pilled and tested as in Example 16. Under these conditions a 220–330° F. naphtha feed having an initial Research octane rating of 58.4 is converted to an 83 volume percent yield of a 95.0 octane number product, at a weight space velocity of 1.6 pounds of oil per hour per pound of catalyst.

EXAMPLE 21

Palladium catalysts of high activity can also be prepared on an alcoholate alumina base. In one such catalyst, the alumina prepared by hydrolyzing the alcoholate solution at room temperature is dried and calcined for 4 hours at 1100° F.; 786 g. of this dried base is impregnated with 786 cc. of an aqueous solution containing 26.1 g. of PdCl$_2$(60% Pd) and 35 cc. of concentrated HCl. The resulting composite is dried at room temperature and at 250° F., pilled, and brought up to reaction conditions in the testing unit for testing according to the standard test procedure. The naphtha product is found to have a Research clear octane rating of 99.0, obtained in a C$_4$—430° F. yield of 88.0 volume percent on feed at a weight space velocity of 2. The excellent stability of this catalyst is shown by a heat aging test in which a sample heated for 64 hours at 1250° F. is still sufficiently active to give a 90.5% yield of 94.5 O.N. product in the same standard test, even though such heating is severe enough to deactivate ordinary noble metal catalysts.

EXAMPLE 22

The known harmful effects of sodium or sulfate as impurities in an alumina base for hydroforming catalysts are found also to be sufficiently severe to prevent the formation of a highly active catalyst when these ions are added during the preparation of a platinum catalyst on alcoholate alumina. Thus, in one experiment where the alcoholate alumina base prepared as in Example 15 is treated with a dilute solution of sodium methyl siliconate to give a base containing 0.5% sodium as Na$_2$O and 1.0% SiO$_2$, and then impregnated with the platinum solution to give a catalyst containing 0.6 wt. percent Pt, the final catalyst tested as in Example 16 gives an octane increase from only 58.4 (feed) to 70.9 (product), at a feed rate of 1 pound of oil per hour per pound of catalyst.

Another catalyst is prepared by hydrolyzing the aluminum alcoholate with water saturated with SO$_2$, and then removing excess SO$_2$ by treating the slurry of hydrous alumina with an ion exchange resin (Amberlite IRA–400, hydroxyl form). This slurry is filtered to remove the resin and dried and calcined to give an alumina base which still shows a qualitative test for sulfate ions. A sample of this base is impregnated with a PtS$_2$ hydrosol made by adding ammonium polysulfide solution (20%) to a chloroplatinic acid solution equivalent to 0.5% Pt on finished catalyst. The impregnated composite is dried and pilled for the standard activity test. This catalyst increases the octane rating of the same feed stock from 58.4 to only about 77.5 at a weight space velocity of 2 pounds of oil per hour per pound of catalyst, which is a poor activity at best in comparison with the highly active catalysts of the present invention.

This effect of impurities is particularly important with respect to the cost of manufacture of alumina-base catalysts, as already discussed above. Aluminum metal which is the raw material for the alcoholate alumina base used in the present invention is much less expensive than the cheapest aluminum salts available commercially. But the most readily available sources of aluminum compounds of even commercial purity are sodium aluminate and aluminum sulfate, and both of these materials contain inorganic ions which are very difficult to remove once they are introduced, and very harmful in a platinum-alumina catalyst.

EXAMPLE 23

The excellent activity and stability of the catalysts of the present invention is shown by a series of activity maintenance tests conducted over an extended period of time under the same conditions of temperature and pressure as in Example 16. The Pt-alcoholate alumina catalyst used in these tests is supported on a base prepared essentially as in Example 15, hydrolyzing the alcoholate solution in this case at 160° F. using 2 volumes of water per volume of alcoholate. 1100 g. of this alumina, dried at 250° F. and calcined at 1100° F. is impregnated with 16.5 of chloroplatinic acid dissolved in 1100 cc. of water, dried at room temperature and at 250° F., pilled and reduced in the test unit for activation.

This catalyst retains its high activity for over 1200 hours of continuous operation without regeneration, at 900° F. and a weight space velocity of 2 w./hr./w. (pounds of oil per hour per pound of catalyst). During this period the product from a 51.7 octane 200–330° F. heavy naphtha feed ranges in octane rating from 98 to 95, with an average correlated yield of 84.7 volume percent C$_5$—430° product at the 95 octane level for this period.

This is a far more stable catalyst than those prepared by impregnating platinum on commercially available aluminas, even where catalysts of high initial activity have been prepared on such bases. Thus, for example, U.S. Patent 2,667,461, granted January 26, 1954, on a "Method of Making Platinum-Containing Catalysts" shows a very real advantage for platinum on certain HF-treated commercial aluminas over similar catalysts supported on a washed alumina gel prepared from aluminum chloride. The octane rating of the product obtained from the washed gel-base catalyst in that case was only 80.0, with a corresponding yield of 98.8 volume percent on feed indicating relatively little activity as compared to the catalysts of the present invention. This gel-base catalyst was derived from aluminum chloride, which is also considerably more expensive than aluminum metal. The more active catalysts therein described were supported on commercial aluminas known as Alorco Grade F–10, a "commercially pure" product believed to be derived from a thoroughly washed Bayer process alumina, and H–41, a "silica-stabilized" alumina believed to be derived from sodium aluminate by precipitation with CO$_2$ in the presence of a small amount of sodium silicate. Life tests under the conditions described above on an F–10 based catalyst containing 0.5% Pt and 1.0% HF but omitting the sulfiding step of this patent show a drop in activity from 100 O.N. for the fresh catalyst to 92 in only sixty hours of operation at 2 w./hr./w. A similar life test on a 0.5% Pt catalyst on H–41 alumina, prepared by direct impregnation with chloroplatinic acid, show an activity drop of about 7 octane units per 100 hours at the 90 octane level, at the same weight space velocity and at the slightly higher pressure of 275 p.s.i.g., which should be expected to give a lower deactivation rate than the 200 pounds pressure used in the above examples.

The above examples have emphasized the advantageous results obtained when hydroforming naphtha fractions in contact with catalysts consisting essentially of platinum on substantially pure alumina derived from an aluminum alcoholate. Similar advantages in terms of the purity and cost of manufacture of an active catalyst may also be important where it is desired to add small amounts of other promoter or stabilizer materials to the composite. For example, a purified silica hydrosol, chromic acid or zirconyl acetate may be added to the alcoholate alumina so as to introduce silica, chromia or zirconia, respectively, into the finished catalyst without adding extraneous undesirable ions to the composite. A specific example of this procedure may be given following the teaching of Example IX of U.S. Patent No. 2,636,865, wherein a silica hydrosol is used to hydrolyze the aluminum alcoholate and prepare the catalyst base.

EXAMPLE 24

A solution of aluminum amylate is prepared as described in Example 15 above. A purified silica hydrosol containing 3% SiO$_2$ is prepared by contacting sodium silicate with an acid-regenerated cation exchange resin (Amberlite IR–120 manufactured by Rohm & Haas, believed to be made by reacting a phenol sulfonic acid with formaldehyde). 2700 cc. of the silica sol thus prepared is diluted to 16 liters with distilled water, and this diluted sol is used to hydrolyze an equal volume of the aluminum amylate solution. The hydrolysis is accomplished by passing the two liquids simultaneously through a centrifugal pump, as described above in Example 15. Upon settling, there is formed an aqueous slurry of hydrous alumina and hydrous silica, from which the petroleum distilled-regenerated alcohol separates as a supernatant liquid, which is separated and dried for re-use as described. The resulting aqueous slurry of hydrous alumina and hydrous silica is dried in an oven at 250° F., to give an alumina-silica catalyst base comprising 90% alcoholate alumina and 10% silicon dioxide.

This base is activated by calcining for nine hours at 900° F., after gradually heating to this temperature; 573 grams of this calcined material are then impregnated with 490 cc. of an aqueous solution containing 7.6 grams of chloroplatinic acid. The impregnated material is dried at room temperature and then at 250° F. After pilling it is tested for hydroforming activity according to the standard procedure outlined in Example 16 above, without further preliminary calcining or reduction.

At a feed rate of 2 w./hr./w. (pounds of oil per hour per pound of catalyst), this catalyst gives a 92.5 volume percent yield of $C_4$—430° product having a clear Research octane number of 96.0. Following regeneration by burning in diluted air, a second cycle with the same catalyst gives a total liquid product having 100.4 Research octane, at the standard feed rate of 1 w./hr./w.

The following examples and/or tests clearly establish that a substantially improved hydroforming process is obtained by the use of alcoholate alumina base catalysts. In these examples or comparisons the alcoholate alumina base catalysts are identified by capital letters and the catalysts used for comparative purposes are identified by arabic numerals. Each of the catalysts used in Examples 25-27 is described in the appendix following Example 27. As there indicated, all of the details of the preparation of certain of the commercial catalysts are not known.

EXAMPLE 25

Table I below, shows hydroforming results comparing molybdenum oxide hydroforming catalysts based on alcoholate alumina with catalysts based on other commercial aluminas. The hydroforming operation was conducted in each case with a fixed bed of catalyst maintained at 900° F. at 200 pounds per square inch pressure feeding a virgin naphtha from West Texas crude boiling in the range of 200° to 330° F. and having a Research octane number of 48.0 and feeding dry hydrogen gas at a rate of 1500 cubic feet per barrel of naphtha feed for cycle lengths of four hours. The catalyst was regenerated between cycles by burning off coke deposits with air. The feed rate was adjusted to give a $C_5+$ product having a Research octane number of 95:

Table I

| Catalyst | Feed Rate, W./Hr./W.[1] | Yield of $C_5+$ Vol. Percent |
| --- | --- | --- |
| A | 0.87 | 77 |
| B | 1.05 | 76 |
| 1 | 0.48 | 76 |
| 2 | 0.70 | 76 |

[1] Weight of naphtha feed per hour per weight of catalyst.

The superior activity of catalysts A and B is obvious from the substantially higher feed rates permitted thereby. All of the catalysts are equivalent in selectivity as judged by the yield of 95 octane number product.

EXAMPLE 26

Table II below gives a further comparison of hydroforming catalysts under slightly different hydroforming conditions. The naphtha feed, temperature, pressure and cycle length were the same as in Example 25. However, in this example the feed was diluted with 2000 cubic feet of wet hydrogen (0.7 mol. percent $H_2O$) per barrel. As before, the feed rate was adjusted to give a 95 octane number product:

Table II

| Catalyst | Feed Rate, W./Hr./W. | $C_5+$ Product D+L @ 212° F.[1] |
| --- | --- | --- |
| C | 0.75 | 26 |
| 3 | 0.43 | 19 |
| 4 | 0.62 | 20 |
| 5 | 0.58 | 23 |

[1] Distillate plus loss at 212° F.

The superior activity of catalyst C is clearly evident. Here again all of the catalysts gave the same yield of gasoline components within plus or minus 1%. However, the superior volatility of the gasoline from catalyst C should be noted.

EXAMPLE 27

In order to test their stability under hydroforming conditions samples of several catalysts were placed in screen containers which were then placed in the reactor of a commercial fixed bed hydroforming plant. The operation conditions of the commercial plant were varied from time to time. However, the range of operating conditions was approximately as follows: pressure 250 p.s.i.g., average temperature 900° to 975° F., recycle gas (60% $H_2$) rate 2000 to 3000 cubic feet per barrel of feed, process cycle length 8 hours, approximately 2 cycles per day. Between cycles the catalyst was regenerated by burning off coke deposits with air. After aging for several months the catalysts were removed from the commercial plant and tested for hydroforming activity in a fixed bed hydroforming pilot plant operated under the conditions described in Example 26. The following data were obtained:

Table III

| Catalyst | Time Aged, Months | Feed Rate for 95 Oct. No., W./Hr./W. |
| --- | --- | --- |
| D | 7 | 0.39 |
| D | 7 | 0.69 |
| E | 12 | 0.56 |
| E | 7 | 0.30 |
| 3 | 12 | 0.34 |
| 3 | 7 | 0.51 |
| 4 | 7 | 0.34 |
| 5 | 7 | 0.34 |

Catalysts E and 4 contain silica as a stabilizing agent and, therefore, should be compared with each other. Catalyst 4 contains 4% silica while catalyst E contains only 2% silica.

The superior stability of catalysts D and E is evident when compared with catalysts 3, 4, and 5 of similar composition. Here again there was no significant difference in the yields of products obtained from these catalysts.

APPENDIX A.—CATALYST IDENTIFICATION

A. A 3% alumina hydrosol was prepared by hydrolyzing aluminum amylate in the presence of acetic acid peptizing agent as described in U.S. 2,656,321. Ammonium molybdate solution was added to give a composition comprising 10% $MoO_3$ and 90% $Al_2O_3$. The mixture was dried at about 250° F. and calcined at about 1000° F.;

B. A 3% alumina hydrosol was prepared by hydrolyzing aluminum amylate in the presence of acetic acid peptizing agent as described in U.S. 2,656,321. The sol was introduced dropwise into boiling butanol so that the water was distilled overhead as an azeotrope with butanol. After removal of the water was complete the alumina was recovered by filtering from the butanol and heating in a steam heated oven. The dried alumina was calcined at 1000° F. and impregnated with 10% $MoO_3$ by soaking in a solution of ammonium molybdate;

C. A solution of aluminum amylate in excess amyl alcohol and petroleum hydrocarbon solvent was hydrolyzed by mixing with twice its volume of water at room temperature. The alumina was dried at 250° F., calcined for 16 hours at 650° F., and impregnated with 10% MoO$_3$ by soaking in ammonium molybdate solution;

D. A 3% alumina hydrosol prepared by hydrolyzing aluminum amylate in the presence of acetic acid peptizing agent as described in U.S. 2,656,321 was spray dried by spraying into hot flue gas. The alumina was calcined for 16 hours at 650° F. and was impregnated with 10% MoO$_3$ by soaking in ammonium molybdate solution;

E. Aluminum amylate solution was hydrolyzed with twice its volume of water containing sufficient 3% silica hydrosol to add 2% by weight of silica to the alumina product. The 3% silica hydrosol was prepared by treating dilute sodium silicate solution with an acid regenerated cation exchange resin. The alumina comprising 2% silica was dried at about 250° F., calcined at about 1000° F., and impregnated with 10% MoO$_3$ by soaking in a solution of ammonium molybdate;

(1) The alumina base is the F-10 grade of Alcoa activated alumina produced by the Aluminum Co. of America. This alumina is thought to be a product of the Baeyer process for alumina purification. The catalyst was prepared by impregnating the base with 10% MoO$_3$ by soaking in ammonium molybdate solution. This catalyst was formerly used in a commercial hydroforming plant;

(2) This commercial catalyst comprises 12% MoO$_3$ and 88% Al$_2$O$_3$, and was manufactured by the Oronite Chemical Co. The exact method of manufacture is not known, but it is thought to include the co-precipitation of alumina (from AlCl$_3$) and molybdena. This catalyst has been employed in commercial hydroforming operations;

(3) This is the prototype batch of the commercial hydroforming catalyst manufactured by the National Aluminate Co. It comprises 10% MoO$_3$ and about 2% silica. This catalyst is presently in use in several commercial fluid hydroforming plants. The catalyst was manufactured by mixing a solution of sodium aluminate containing sodium silicate with a solution of aluminum sulfate containing sulfuric acid. The precipitate was filtered, spray dried, washed and impregnated with molybdena by soaking in ammonium molybdate solution;

(4) The alumina base is the XH-42 grade of Alcoa activated alumina containing 4% silica manufactured by the Aluminum Co. of America. The catalyst was prepared by impregnating the base with 10% MoO$_3$;

(5) This is the commercial catalyst, comprising 10% of MoO$_3$, manufactured by the American Cyanamid Co. The method of manufacture is not known. This catalyst is employed in several commercial hydroforming plants.

EXAMPLE 28

The following data in Table IV comparing fresh platinum catalyst (i.e. not regenerated during the run) were obtained with a virgin naphtha feed stock (200/300° F. V.T.) from a West Texas crude having the following inspections:

Distillation:
I.B.P. _____ 223° F.
10% _____ 238° F.
50% _____ 257° F.
70% _____ 270° F.
F.B.P. _____ 317° F.
Aniline point _____ 124° F.
Sulfur _____ 0.6 wt. percent.
Gravity _____ 55.4° API.
Octane _____ 51.7 Research clear.

The catalyst tested was in the form of a 500 cc. fixed bed in a reactor submerged in a heated fluidized sand bath. The conditions were: pressure—200 p.s.i.; sand bath (S.B.) temperature—940° F.; space velocity—2 or 4 v./v./hr.; hydrogen rate (once through)—5000 s.c.f./bbl.; time—several hundred hours for each catalyst. The data are correlated at a C$_5$+ product clear research octane number of 95.

Table IV

| Catalyst | H | 7 | 8 | 9 |
|---|---|---|---|---|
| Yields: | | | | |
| C$_5$+, vol. percent | 86.1 | 82.8 | 82.1 | 85.9 |
| C$_4$, vol. percent | 3.6 | 6.6 | 6.5 | 3.2 |
| Dry Gas, wt. percent | 6.5 | 7.4 | 8.0 | 7.2 |
| Distillation @ 212° F., percent off on C$_5$+ product | 9 | 13-16 | 18 | 10 |

*Catalyst H.*—1 vol. of aluminum amylate was hydrolyzed with 2 vol. of water at room temperature. The organic phase was decanted and the precipitate was then stripped and dried overnight at 250° F. The alumina was then activated by calcination at 1100° F. for 4 hours. An amount of chloroplatinic acid (40% Pt) in water just sufficient to wet the calcined alumina was added. The mixture was then mixed, dried overnight at 250° F. and pilled. The catalyst contained 0.6 wt. percent Pt.

*Catalyst 7.*—The alumina base is the H-41 grade of Alorco activated alumina manufactured by the Aluminum Company of America, and contains about 5.5% SiO$_2$. It has a surface area of about 260-320 m.$^2$/gm. This alumina is impregnated with chloroplatinic acid dried by slow heating in a hydrogen atmosphere to 900° F. It contains 0.5% Pt;

*Catalyst 8.*—Obtained from the American Cyanamid Co. Believed to be a gamma form of alumina. It is a pilled catalyst (⅛″ x ⅛″) containing 0.6 wt. percent Pt and having a surface area of 209 m.$^2$/gm. and a permeability [1] of 1.4;

*Catalyst 9.*—Obtained from Baker and Co., Inc. Identified as RD-150. It is an extruded catalyst (1/16″ x ⅛″) containing 0.6 wt. percent Pt and initially 1.7% Cl. It has a surface area of 358 m.$^2$/gm. and a permeability [1] of 15.

These data show that the catalyst of this invention is more selective to C$_5$+ gasoline than the prior art catalysts.

EXAMPLE 29

The following data comparing an alcoholate alumina platinum catalyst with its nearest competitor in performance in Table IV, catalyst #9, were obtained using a feed stock (250/325° F. V.T.) having the following inspections:

Distillation:
I.B.P. _____ 255° F.
10% _____ 270° F.
50% _____ 280° F.
70% _____ 285° F.
90% _____ 293° F.
F.B.P. _____ 327° F.
Aniline point _____ 126° F.
Sulfur _____ 0.001 wt. percent.
Gravity _____ 57.7° API.
Octane _____ 53 clear Research.

The alcoholate alumina catalyst, catalyst I used in this test was prepared by hydrolyzing an aluminum alcoholate diluted with a hydrocarbon solvent with water containing about 2.4 wt. percent NH$_3$, aging the precipitate for 9 hours, stripping with steam to remove solvent and alcohol, filtering the precipitate, drying at 250° F., ---
[1] (Cc./min. of dry N$_2$ diffusing through pill 5 x 5 mm. at one atm. press.)

grinding the alcoholate alumina, activating at 1050° F. for 4 hours, impregnating with chloroplatinic acid sufficient to obtain 0.6 wt. percent Pt on the catalyst, drying at 250° F., pilling, and calcining 1 hour at 1100° F.

The catalyst was contained in 4 reactors in series, each consisting of insulated one inch extra heavy stainless steel pipe. The conditions were: over-all space velocity—1 w./hr./w.; pressure—400 p.s.i.g.; hydrogen rate—5000–6000 s.c.f./bbl. The C$_5$+ product selectivity was maintained between 84.5 and 86.2 throughout the run. The temperature, both preheat and reheat between the reactors, was adjusted throughout the run to maintain a 94–96 clear Research octane number product. A log of time versus temperature required for a 95 octane product is shown in Table V.

*Table V*

| Hours of Run | Temperature, ° F., for 95 O. N. | |
| --- | --- | --- |
| | Catalyst I | Catalyst 9 |
| Start | 908 | 908 |
| 50 | 910 | 917 |
| 100 | 912 | 922 |
| 200 | 915 | 924 |
| 300 | 918 | 927 |
| 400 | 919 | 928 |
| 600 | 920 | 932 |
| 800 | 921 | 933 |
| 1,000 | 921.5 | 935 |
| 1,200 | 922 | 937 |
| 1,400 | 922.5 | 938 |
| 1,600 | 923 | 938.5 |
| 1,800 | 924 | 939 |

The data in Table V illustrate the high activity of the alcoholate alumina base catalyst because the feed preheat requirement is substantially lower. The average feed preheat requirement for the alcoholate alumina base catalyst is about 12–15° F. lower, indicating that the absolute activity of this catalyst is higher. These data also illustrate the high stability of the alcoholate alumina base catalyst. A 300-hour run with an 84.5% C$_5$+ yield after five regenerations has indicated that a six months' catalyst life is possible.

The platinum-containing catalysts prepared in accordance with the present invention are particularly suitable for hydroforming hydrocarbon fractions boiling within the motor fuel or naphtha range. In such hydroforming operations, temperatures are usually between 600°–1050° F., preferably 800°–950° F., the pressure between atmospheric and 1000 pounds per square inch, and hydrogen or hydrogen-rich recycle gas is recirculated through the reaction zone at a rate of about 1000–12,000, preferably about 6000, cubic feet per barrel of feed. This hydrogen-rich gas contains at least about 60 volume percent hydrogen, preferably 80–99% hydrogen by volume. The oil feed rate in a fixed bed operation is about 0.25 to about 4.0 v./v./hr. (volume of liquid feed naphtha per volume of catalyst per hour), preferably 1–2 v./v./hr.

It will be understood that these catalysts are equally suitable for use in a fluid bed type operation. Accordingly, these catalysts may be used either in the form of pills or in the form of a finely divided powder. They may also be converted into microspheres, according to the general techniques described in my prior patent, U.S. 2,636,865. This may be accomplished either by emulsifying an alumina hydrosol with naphtha, as described therein, using "aerosol" as an emulsifying agent. Such a hydrosol may be prepared directly in the hydrolysis, or by peptizing the initial gel slurry, and the hydrosol may be dried directly in the form of microspheres by the spray drying technique. The impregnation with platinum may take place at any stage of this process, either before or after the hydrosol is formed and dried or spray dried.

The catalysts prepared as described above give good results in hydroforming operations at high pressures of from about 500–1000 p.s.i.g., but they are especially effective at low pressures of the order of from 50–400 p.s.i.g. These catalysts are also useful in a wide variety of hydrocarbon conversion reactions or similar reactions where hydrogen transfer to or from a hydrocarbon chain is involved, including hydrogenation, dehydrogenation, cyclization, isomerization, alkylation or polymerization reactions and the like.

Although in the examples given above the catalytic materials made by this process were dried at a temperature of 250° F. and activated by heating at about 850°–900° F., these temperatures may be varied. Thus, the activation may be accomplished by heating to a temperature within a range of 850°–1450° F., for a suitable period, such as from one to eight hours, or the activation may be limited entirely to that obtained by placing the dried catalyst in the reaction zone and bringing it up to reaction temperature for use in hydroforming or the like.

In hydrocarbon conversion operations such as hydroforming at a relatively low total pressure, where carbonaceous material is deposited on the catalyst, it is contemplated that the catalyst will be regenerated by treating with a regenerating gas such as diluted air or hydrogen or other suitable gas, and the regenerated catalyst re-used. It is also contemplated that the catalyst be treated with a halogen compound, preferably chlorine or hydrogen chloride before, during or after the regeneration treatment.

The foregoing examples are merely illustrative of the present invention. It will be understood that numerous variations are possible without departing from the scope of the following claims.

What is claimed is:

1. A process for manufacturing naphtha reforming catalysts which comprises preparing a solution of an aluminum alcoholate, hydrolyzing said solution to form high purity alcoholate alumina, compositing this alcoholate alumina with an active reforming catalyst, drying and calcining the resultant product to activate the same.

2. A process for manufacturing naphtha reforming catalysts which comprises preparing a solution of an aluminum alcoholate, hydrolyzing said solution to form high purity alcoholate alumina, compositing this alcoholate alumina with a group VI metal oxide, drying and calcining the resultant product to activate the same.

3. A process for manufacturing naphtha reforming catalysts which comprises preparing a solution of an aluminum alcoholate, hydrolyzing said alcoholate with an aqueous medium to form a hydrous alumina therefrom, drying said hydrous alumina to form high purity alcoholate alumina base, impregnating said base with a solution of a platinum group metal compound, drying said impregnated alcoholate alumina base and calcining the resultant product to activate the same.

4. A process for manufacturing a platinum-alumina catalyst which comprises preparing a solution of an aluminum alcoholate, hydrolyzing said solution to form high purity alcoholate alumina and compositing this alcoholate alumina with an aqueous solution containing chloroplatinic acid, drying and calcining the resultant product to activate the same.

5. A process for manufacturing a platinum-alumina catalyst which comprises preparing a solution of an aluminum alcoholate, hydrolyzing said solution to form high purity alcoholate alumina and compositing this alcoholate alumina with an aqueous solution containing chloroplatinic acid and an added halogen compound, drying and calcining the resultant product to activate the same.

6. A catalyst composition for the reforming of naphtha boiling range hydrocarbons comprising an active reforming catalyst agent supported on high purity alcoholate alumina base.

7. A catalyst composition for the reforming of naphtha boiling range hydrocarbons comprising a group VI metal oxide supported on a high purity alcoholate alumina base.

8. A catalyst composition for the reforming of naptha boiling range hydrocarbons comprising a platinum group metal supported on a high purity alcoholate alumina base.

9. A catalyst composition for the reforming of naphtha boiling range hydrocarbons comprising 0.01 to 2.0 wt. percent platinum supported on a high purity alcoholate alumina base.

10. The method of hydroforming hydrocarbon fractions boiling within the naphtha or motor gasoline boiling range which comprises passing the vaporized hydrocarbon feed stock in admixture with hydrogen-rich gas through a hydroforming reaction zone, maintaining the naphtha vapors and hydrogen-containing gas in contact with a catalyst comprising an active reforming catalyst agent supported on a high purity alcoholate alumina base at active hydroforming conditions of temperature and pressure for a period sufficient to substantially increase the octane number of said hydrocarbon fraction.

11. The method of hydroforming hydrocarbon fractions boiling within the naphtha or motor gasoline boiling range which comprises passing the vaporized hydrocarbon feed stock in admixutre with hydrogen-rich gas through a hydroforming reaction zone, maintaining the naphtha vapors and hydrogen-containing gas in contact with a catalyst comprising a group VI metal oxide supported on a high purity alcoholate alumina base at active hydroforming conditions of temperature and pressure for a period sufficient to substantially increase the octane number of said hydrocarbon fraction.

12. The method of hydroforming hydrocarbon fractions boiling within the naphtha or motor gasoline boiling range which comprises passing the vaporized hydrocarbon feed stock in admixture with hydrogen-rich gas through a hydroforming reaction zone, maintaining the naphtha vapors and hydrogen-containing gas in contact with a platinum group metal supported on a high purity alcoholate alumina base at active hydroforming conditions of temperature and pressure for a period sufficient to substantially increase the octane number of said hydrocarbon fraction.

13. The method of hydroforming hydrocarbon fractions boiling with the naphtha or motor gasoline boiling range which comprises passing the vaporized hydrocarbon feed stock in admixture with hydrogen-rich gas through a hydroforming reaction zone, maintaining the naphtha vapors and hydrogen-containing gas in contact with a catalyst comprising 0.01 to 2.0 wt. percent platinum supported on a high purity alcoholate alumina base at active hydroforming conditions of temperature and pressure for a period sufficient to substantially increase the octane number of said hydrocarbon fraction.

14. The process for hydroforming hydrocarbon feed stock boiling in the naphtha boiling range which comprises vaporizing the feed stock, passing the vapors together with preheated hydrogen-containing gas through a hydroforming reaction zone maintained at a reforming temperature between about 750° F. and 1050° F. and pressure between atmospheric and 1000 p.s.i.g., maintaining the naphtha vapors in contact with a catalyst comprising 0.01 to 2.0 wt. percent platinum supported on a high purity alcoholate alumina for a period sufficient to substantially increase the octane number of said hydrocarbon feed stock.

15. The process for hydroforming hydrocarbon feed stock boiling in the naphtha boiling range which comprises vaporizing the feed stock, passing the vapors together with preheated hydrogen-containing gas through a hydroforming reaction zone maintained at a reforming temperature between about 850° and 975° F. and pressure between 100 and 400 p.s.i.g., maintaining the naphtha vapors in contact with a catalyst comprising 0.01 to 2.0 wt. percent platinum supported on a high purity alcoholate alumina for a period sufficient to substantially increase the octane number of said hydrocarbon feed stock.

References Cited in the file of this patent

UNITED STATES PATENTS

| | | |
|---|---|---|
| 2,636,865 | Kimberlin | Apr. 28, 1953 |
| 2,746,937 | Hunter et al. | May 22, 1956 |
| 2,773,810 | Kimberlin et al. | Dec. 11, 1956 |
| 2,776,264 | Dinwiddie et al. | Jan. 1, 1957 |